Dec. 8, 1964  C. DOBELL  3,160,195
STRIP WRAPPING

Filed July 11, 1960  2 Sheets-Sheet 2

*INVENTOR.*
CURZON DOBELL
BY
Philip Mintz
ATTORNEY.

3,160,195
STRIP WRAPPING
Curzon Dobell, Nassau, Bahamas
Filed July 11, 1960, Ser. No. 41,876
19 Claims. (Cl. 153—64)

This invention relates to method and apparatus for helically winding strip material. More particularly, this invention relates to method and apparatus for producing the desired tension and stress distribution in strip material being wound in a helical fashion around a mandrel.

This invention finds particular utility in connection with the preparation of pressure containing vessels as taught in U.S. patent application Serial No. 41,931 filed July 11, 1960 by Dobell and Roberts, wherein a different tension is applied to the opposite edges of the strip being wound around the mandrel.

It is an object of this invention to provide a method and apparatus for producing the desired tension and stress distribution in strip material being helically wound about a mandrel.

It is a further object of this invention to provide apparatus of this type which is relatively simple in construction and trouble free in operation while having the maximum versatility.

These objects and other objects and advantages of this invention which will become apparent as this specification proceeds are achieved by deflecting one edge of the strip material more than the other edge of the strip as it travels from the supply to the mandrel during the winding operation.

Illustrative of specific embodiments of this invention are the accompanying drawings in which.

Figure 1:
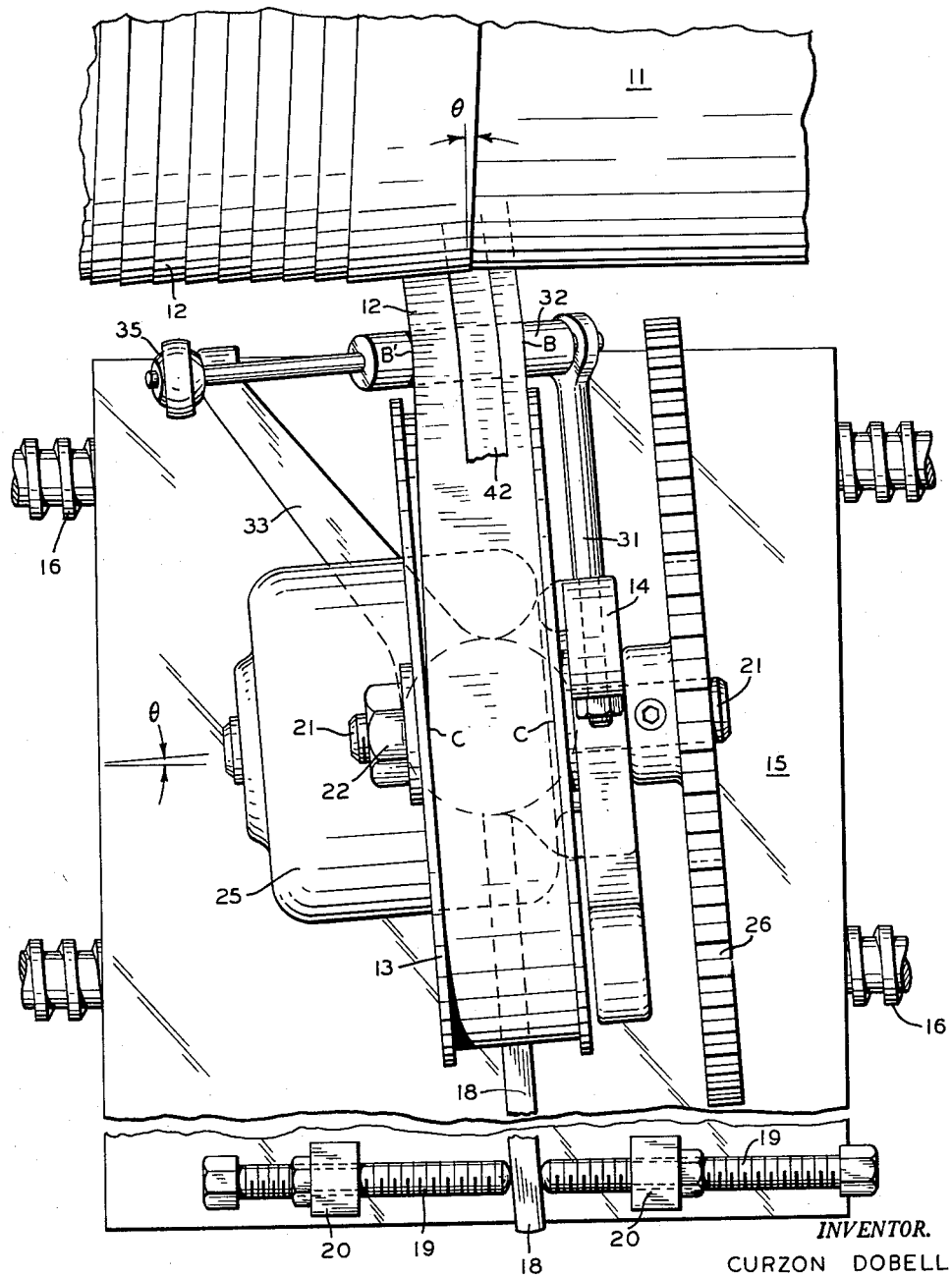
FIG. 1 is a partial plan view of apparatus constructed in accordance with this invention.
Figure 2:
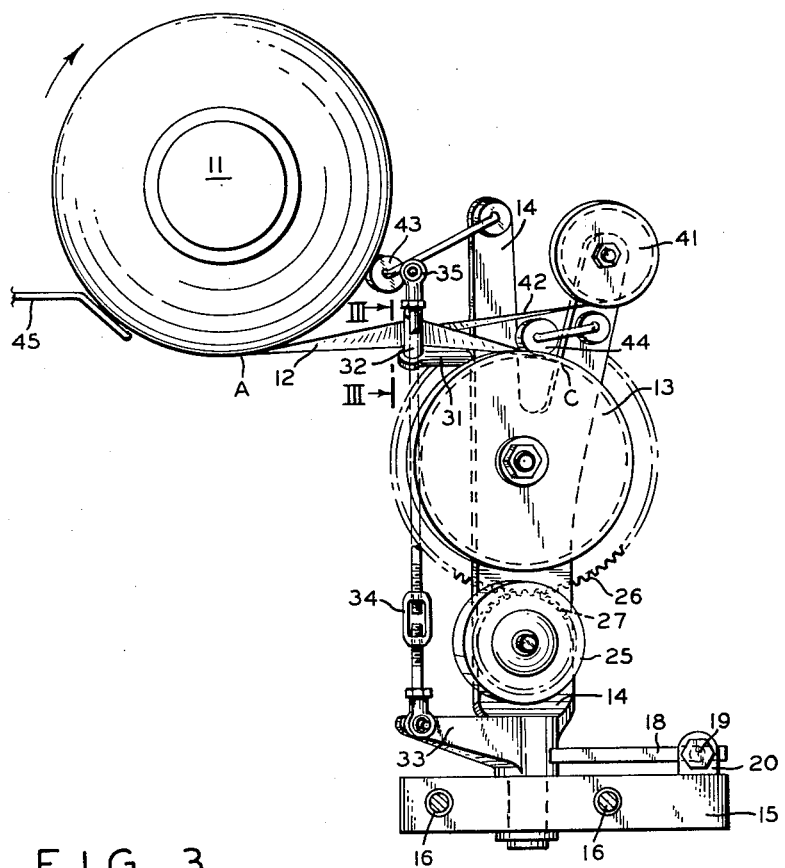
FIG. 2 is an elevational view of the apparatus of FIG. 1.
Figure 3:
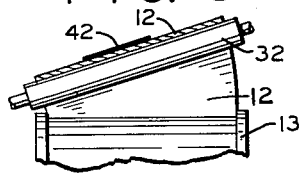
FIG. 3 is a view taken along line III—III of FIG. 2.

Referring next to the drawings, and more particularly to FIGS. 1 and 2, there is illustrated a mandrel 11, adapted to be rotated in the direction indicated by the arrow by means of a lathe chuck, not shown, upon which the pressure containing vessel is to be constructed by the helical wrapping of strip material 12 which is fed from a reel 13. Reel 13 is supported for rotation on bracket 14 which is mounted on lathe carriage 15 supported on lathe screws 16. Since the rotation of lathe screws 16 is coordinated by the lathe with the rotation of mandrel 11, lathe carriage 15 and reel 13 move longitudinally parallel to the axis of mandrel 11 at a rate proportional to the rate of rotation of mandrel 11 to provide for the wrapping of strip 12 around mandrel 11 at the desired helix angle θ.

Bracket 14 is mounted on lathe carriage 15 so that it can be rotated by means of arm 18 acting in conjunction with screws 19 and threaded brackets 20. A calibrated dial may be provided for indicating the setting of arm 18 thereby indicating the angle between the axis of reel 13 and the axis of mandrel 11. By this adjustable means, the axis of reel 13 is canted with respect to the axis of mandrel 11 by an amount equal to the helix angle θ of the pressure containing vessel to be constructed. This permits strip 12 to be withdrawn from reel 13 smoothly and without any tendency for sideways slippage.

Reel 13 is supported on bracket 14 on rotatable axle 21 and is held in place by nut 22. Since it is desired to pull strip material 12 from reel 13 under tension, means is provided for braking the rotation of reel 13 on axle 21. In the specific means illustrated herein, such braking means includes a dynamometer 25 which is mounted on bracket 14 and which is provided with suitable conventional means for controlling the torque of the dynamometer brake 25. Since the dynamometer will normally operate best at a somewhat higher rotational speed than the rotational speed imparted to axle 21 by the withdrawal from reel 13 of strip 12, a pair of speed increasing gears 26, 27 are affixed to axle 21 and to the rotor of dynamometer 25 (through an integral gear box coupled to the dynamometer) so as to permit dynamometer 25 to operate at a higher rotational speed than reel 13 and to mechanically interconnect them so that braking action applied to dynamometer 25 serves to retard the motion of reel 13.

Of course, any other conventional braking mechanism may be mounted on bracket 14 and applied so as to retard the rotary motion of reel 13 to produce the desired braking effect. Illustrative of such other types of braking mechanism might be mentioned a hydraulic pump pumping against a pressure relief valve, the work of pumping serving for braking reel 13; a Prony brake applied to axle 21 to retard the rotation of reel 13; or an automotive type brake applied to axle 21.

In order to produce a constant tension during the unwinding of strip 12 from reel 13, the amount of braking force applied must be varied continuously. With the dynamometer type brake illustrated here, the compensation of the braking force with change in radius of strip 12 on reel 13 inherently occurs. With other types of conventional brake mechanisms, compensators may be incorporated to vary the braking force to maintain constant tension on strip 12 leaving reel 13 as the radius decreases.

Mounted near the upper end of bracket 14 is a support 31 for one end of roller 32. The other end of roller 32 is supported from the lower end of bracket 14 on arm 33 by means of turnbuckle assembly 34 and bearing assembly 35. It will thus be seen that, with this mounting, by rotation of turnbuckle 34, one end of roller 32 may be raised and lowered with respect to the other end of roller 32 thereby adjustably skewing roller 32 with respect to the axis of reel 13 and the axis of mandrel 11. Turnbuckle assembly 34 may be calibrated to provide a direct visual indication of the degree of skewness of roller 32.

Passage of strip 12 over skewed roller 32 on its way to mandrel 11 differentially deflects strip 12 and redistributes the tension in strip 12 imparted by dynamometer brake 25 as will be hereinafter explained.

As disclosed in the aforementioned patent application of Dobell and Roberts, the overlapping portions of the strip material forming the pressure containing vessel are brazed to each other. (In order to simplify the drawings, the structures relating to the brazing have been omitted from FIG. 1, but are illustrated in FIG. 2.)

To provide for the brazing operation, the upper portion of bracket 14 may be provided with means for supporting a roll 41 of braze material 42 which is fed between the layers of strip material 12 on mandrel 11. It will be noted that braze material 42 also passes over roller 32 and is deflected thereby in a manner similar to strip 12.

Also mounted on bracket 14 are a pair of flux applicators 43, 44 which apply flux to opposite sides of strip 12 for promoting the subsequent brazing operation. Also mounted on lathe carriage 15 by means, not shown, to follow along with the motion of bracket 14 is a heater 45 which serves to fuse the braze 42 thereby bonding the laps of strip 12 to each other progressively during the winding operation.

As pointed out in the aforementioned U.S. patent application of Dobell and Roberts, the opposite edges of strip 12 are subjected to different tensions during the operation of winding around mandrel 11. The difference in tensions between the high tension side of strip 12 and the low tension side of strip 12 is determined from the iameter and total thickness of the pressure containing vessel being produced and the width of strip 12. In order to minimize the total tension applied to strip 12, is desirable to have the low tension side of strip 12 at a nsion as close to zero as possible during winding.

In order to prevent slippage of strip 12 around reel 3 under the tension produced by the pull of mandrel 1 and the drag of braking means such as the dynamometer 25 during the winding operation, the strip is wound ound reel 13 under a tension which is substantially e average of the tensions to be used in the winding operion around mandrel 11. This average pre-tension is corporated during the manufacture of strip 12, particurly during the step of winding strip 12 around reel 13.

In a preferred mode of operation, the apparatus is set substantially as illustrated with arm 18 positioned so e axis of reel 13 is canted with respect to the axis mandrel 11 by an amount equal to the helix angle $\theta$ the pressure containing vessel to be constructed but ith roller 32 lowered to a position out of contact with rip 12. Strip 12 is then led straight from reel 13 and secured to a portion of mandrel 11 or to end porons of the pressure containing vessel to be constructed tached to mandrel 11. After thus securing strip 12, e roller 32 is then positioned by means of turnbuckle to the skewed position which is appropriate for the rticular pressure containing vessel to be constructed. fter thus adjusting roller 32, the lathe is started and aking force applied to dynamometer 25, whereupon rip 12 is helically wrapped around mandrel 11 in the propriate configuration.

The angle to which roller 32 is skewed with respect the axis of reel 13 is such as to differentially stretch e opposite sides of strip 12 passing thereover, and is a nction of the geometry of the apparatus, but is such to satisfy the following conditions.

The differential stretch imparted to the opposing edges strip 12 by the deflection produced by passage over ller 32 may be represented by the following equation:

$$\frac{L}{1} = \frac{R+T}{R}$$

ierein:
=the stretched length of a unit length of strip along the edge AB'C receiving the greater tension;
=the stretched length of a unit length of strip along the edge ABC receiving the lesser tension;
=the inside radius of the pressure containing vessel being constructed; and
=the thickness of the pressure containing vessel.

I will be apparent that because of the differential etching of the opposite edges of strip 12, that the edge ich is stretched to the greater length must travel at a her linear speed than the other edge. Accordingly, re is a slight slippage of the strip over roller 32. hen narrow strip is used this slippage may not be obtionable. However, where wide strip is used, or where s slippage is objectionable, the alternative rollers iltrated in FIGS. 4 and 5 may be used.

Figure 4:
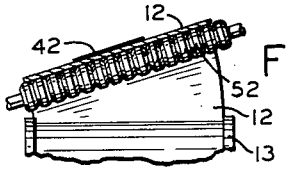
FIGS. 4 and 5 are alternative embodiments of the roller illustrated in FIG. 3.

In FIG. 4 there is shown a roller 52 composed of a rality of independently rotatable segments mounted a common shaft which may be substituted for the ler 32 in the apparatus previously described. It is dily apparent that the slippage will be eliminated bese the various segments are free to adjust their own pective speeds to that of the speeds of the portions of ip 12 passing thereover.

Figure 5:
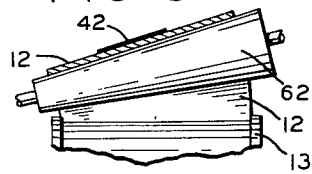

In FIG. 5, cone-shaped roller 62 may be substituted roller 32 in the apparatus previously described. It apparent that the edge of strip 12 which has been etched the greater amount, and which therefore travels the higher speed, passes over the portion of roller 62 ich has a greater diameter and is, therefore, moving at greater speed. Thus, the tendency to slip may be ninated by the selection of the appropriate shape of ical roller, which shape is directly related to the inside and outside dimensions of the pressure containing vessel being constructed.

As is readily apparent, the apparatus and method of this invention need not necessarily be used in connection with a lathe for rotating mandrel 11 while providing the longitudinal movement of blade carriage 15. This method and apparatus could also be utilized with a stationary mandrel 11 and with the remaining portions of the structure mounted for combined longitudinal and orbital movement around the stationary mandrel to wrap strip 12 around the mandrel.

It will thus be seen that herein has been provided a method and apparatus for wrapping strip in an overlapping helical pattern around a mandrel which appropriately tensions and differentially stresses the strip being wrapped.

While a specific embodiment of this invention has been illustrated and described, it is not intended that the definition of this invention be limited to the specific details described, but is to encompass all equivalent fairly included within the scope of the subjoined claims.

I claim:

1. Apparatus for wrapping strip material which comprises a mandrel around which said strip material is to be wrapped; supply means for supplying said strip material under tension to said mandrel under a predetermined helix angle such that the strip windings have overlapping relationship with one another; and deflecting means engaging the portion of the strip material between said supply means and said mandrel, to effect redistribution of the tension in said strip material, said deflecting means being so constructed and arranged that the trailing edge portion of the strip material is deflected more than the leading edge portion, whereby correspondingly greater tension is applied to the trailing edge portion than to the leading edge portion, producing a corresponding differential stretch between said edge portions, for accommodating said overlapping relationship.

2. Apparatus as defined in claim 1 wherein said last-mentioned means comprises a roller over which the strip material passes, the axis of said roller being skewed with respect to the axis of said mandrel and with respect to the plane of the strip material leaving the supply means.

3. Apparatus as defined in claim 2 wherein said roller comprises a plurality of independently rotatable segments mounted on a common axis.

4. Apparatus as defined in claim 2 wherein said roller includes at least a cone shaped portion.

5. Apparatus according to claim 1, with the addition of means for bonding the strip windings to one another in the area of the overlap.

6. Apparatus for helically wrapping strip material comprising a mandrel around which said strip material is to be wrapped; support means supporting a reel of strip material and arranged relative to said mandrel for supplying said strip material to said mandrel under a predetermined helix angle such that the strip windings have overlapping relationship with one another; braking means for braking the rotation of said reel incident to withdrawal of the strip material from the reel by the winding operation; and deflecting means engaging the portion of the strip material between said reel and said mandrel to effect redistribution of the tension in said strip material, said deflecting means being so constructed and arranged that the trailing edge portion of the strip material is deflected more than the leading edge portion, whereby correspondingly greater tension is applied to the trailing edge portion than to the leading edge portion, providing a corresponding differential stretch between said edge portions, accommodating said overlapping relationship.

7. Apparatus as defined in claim 6 wherein said last-mentioned means comprises a roller over which the strip material passes, the axis of said roller being skewed with respect to the axis of the reel of strip material.

8. Apparatus as defined in claim 7 including means for adjusting the degree of skewness of said roller with respect to the axis of the reel of strip material.

9. Apparatus as defined in claim 7 wherein said roller comprises a plurality of independently rotatable segments mounted on a common axis.

10. Apparatus as defined in claim 7 wherein said roller includes at least a cone shaped portion.

11. The apparatus according to claim 6, with the addition of means for bonding the strip windings to one another in the area of the overlap.

12. In apparatus for helically wrapping strip material, means for supplying said strip under proper tension appropriately distributed comprising; carriage means adapted to move longitudinally of the axis of the object being formed; support means mounted on said carriage means for supporting a reel of strip material for rotation; brake means mounted on said support means for braking the rotation of the reel of strip material; and roller means mounted on said support means with its axis skewed with respect to the axis of the object being formed over which the strip material is deflected on leaving the reel.

13. The apparatus according to claim 12, with the addition of means for bonding the strip windings to one another in the area of the overlap.

14. In apparatus for helically wrapping strip material, means for supplying said strip under proper tension appropriately distributed comprising; carriage means adapted to move longitudinally of the axis of the object being formed; support means mounted on said carriage means for supporting a reel of strip material for rotation; adjusting means for adjusting the angle between the axis of reel of strip material and the axis of the object being formed; and roller means mounted on said support with its axis skewed with respect to the axis of the object being formed over which the strip material is deflected on leaving the reel.

15. In apparatus for helically wrapping strip material, means for supplying said strip under proper tension appropriately distributed comprising; carriage means adapted to move longitudinally of the axis of the object being formed; support means mounted on said carriage means for supporting a reel of strip material for rotation; brake means mounted on said support means for braking the rotation of the reel of strip material; roller means mounted on said support with its axis skewed with respect to the axis of the object being formed over which the strip material is deflected on leaving the reel; and adjusting means for adjusting the degree of skewness of said roller means with respect to the axis of the object being formed.

16. In the process of helically winding strip material around a mandrel under tension from a source of supply, which comprises supplying the strip material to the mandrel under tension at a helix angle such that the strip windings have overlapping relationship with one another, and redistributing the tension in said strip material by deflecting the strip material between said source of supply and said mandrel so that the trailing edge portion of the mandrel is deflected more than the leading edge portion thereof, whereby correspondingly greater tension is applied to the trailing edge portion than to the leading edge portion, producing a corresponding differential stretch between said edge portions, accommodating said overlapping relationship.

17. A process as defined in claim 16 wherein said deflection is such as stretch the edge receiving the greater deflection more than the edge receiving the lesser deflection in proportion to the ratio of the sum of the inside radius of the object being produced and the thickness of said object to the inside radius of said object.

18. In a process of producing a pressure containing vessel the combination of steps which comprise helically winding strip material around a mandrel from a source of supply under tension at a helix angle such that the strip windings have overlapping relationship with one another; redistributing the tension in said strip material by deflecting the strip material between said source of supply and said mandrel so that the trailing edge portion of the material is deflected more than the leading edge portion thereof, whereby correspondingly greater tension is applied to the trailing edge portion than to the leading edge portion, producing a corresponding differential stretch between the edge portions, accommodating said overlapping relationship; and bonding the strip windings to one another in the area of the overlays.

19. A process as defined in claim 18 wherein the opposite edges of the strip material are differentially stretched by amounts as defined in the following equation:

$$\frac{L}{1} = \frac{R+T}{R}$$

wherein:

$L$ = the stretched length of a unit length of strip along the edge receiving the greater deflection;

$1$ = the stretched length of a unit length of strip along the edge receiving the lesser deflection;

$R$ = the inside radius of the pressure containing vessel being produced; and $T$ = the thickness of the pressure containing vessel.

References Cited in the file of this patent

UNITED STATES PATENTS

| | | |
|---|---|---|
| 1,627,681 | Woodruff | May 10, 1927 |
| 1,884,658 | Gladkov et al. | Oct. 25, 1932 |
| 2,600,630 | Fergusson | June 17, 1952 |
| 2,734,471 | Bornand | Feb. 14, 1956 |